(No Model.)

E. WOOLSON.
VEHICLE WHEEL.

No. 446,910. Patented Feb. 24, 1891.

WITNESSES:
O. D. Smith
Asley T. Munson

INVENTOR
Egbert Woolson
BY
N. W. Wooster
HIS ATTORNEY.

UNITED STATES PATENT OFFICE.

EGBERT WOOLSON, OF BROOKLYN, NEW YORK, ASSIGNOR TO ALDEN SOLMANS, OF SOUTH NORWALK, CONNECTICUT.

VEHICLE-WHEEL.

SPECIFICATION forming part of Letters Patent No. 446,910, dated February 24, 1891.

Application filed January 2, 1891. Serial No. 376,500. (No model.)

*To all whom it may concern:*

Be it known that I, EGBERT WOOLSON, a citizen of the United States, residing at Brooklyn, in the county of Kings and State of New York, have invented certain new and useful Improvements in Vehicle-Wheels; and I do hereby declare the following to be a full, clear, and exact description of the invention, such as will enable others skilled in the art to which it appertains to make and use the same.

My invention relates to the class of vehicle-wheels in which a cushion tire is interposed between an outer metallic tire and the felly, and has for its objects to provide a wheel of this class which shall be simple and economical in construction, in which the elasticity of the wheel shall be retained during the life thereof, which shall be thoroughly durable, and in which it shall be impossible, no matter how severe may be the usage, to compress the cushion tire outward laterally to any appreciable extent, the result being that the elastic and noiseless qualities of the wheel are made practically permanent instead of temporary. With these ends in view I have devised the simple and novel construction which I will now describe, referring by numerals to the accompanying drawings, forming part of this specification, in which—

Figure 1:
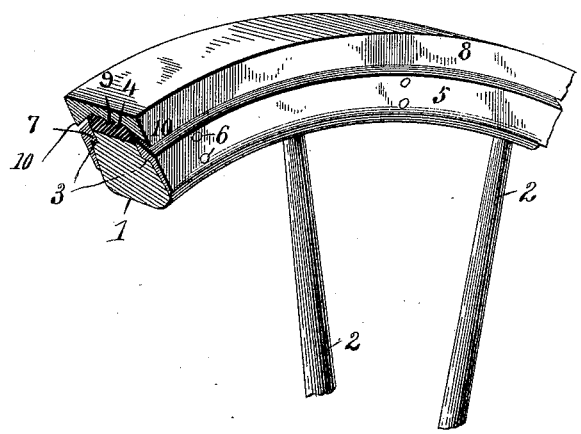
Figure 2:
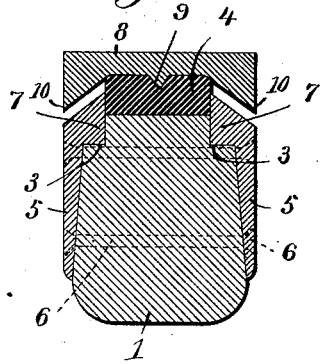

Figure 1 is a perspective of a section of a wheel embodying my novel invention, and Fig 2 is a cross-section of the felly, side pieces, cushion tire, and metallic tire.

In use my novel wheel is equally adapted for the purposes of heavy trucking or for light road-wagons. When used upon heavy wagons, it greatly increases the durability of the wheels, as it prevents the stretching of the tires and the crushing of the fellies. The same result follows when the invention is applied to light road-wagons, in which latter use it is particularly valuable in that it causes the wagons to run noiselessly and ride easily.

1 denotes the felly, in which the spokes 2 are secured in any ordinary or preferred manner. At both edges of the felly on its outer periphery the wood is removed, leaving shoulders 3, the central portion of the felly, extending straight outward from said shoulders.

4 denotes the cushion tire, which is preferably a band of rubber rectangular in cross-section.

5 denotes metallic side pieces, which are secured on opposite sides of the felly by rivets 6, extending through the felly transversely. These side pieces are provided on their inner sides with projections 7, the inner faces of which rest against the central portion of the felly and the lower faces of which rest against shoulders 3. These projections extend outward beyond the periphery of the felly and part of the height of the cushion tire, supporting the latter on both sides and preventing it from expanding laterally. The tops of said projections—that is, their outer peripheries— incline from their inner faces downward and outward, as clearly shown in Fig. 2.

8 denotes the tire, the central portion of which rests against the cushion tire. One or more ribs 9, one only being shown in the drawings, are provided on the inner face of the tire, which engage the cushion tire and assist in holding the tire against lateral displacement. On the inner periphery of the tire at the edges are projections 10, said projections being widest on their outer faces and inclining upward and inward parallel, or substantially so, with the inclines upon the outer peripheries of the side pieces, leaving a space between said projections and side pieces. The inclines upon the tire terminate at about the edges of the cushion tire, so that the edges of the cushion tire lie in the angles formed by the intersection of the inner faces of projections 10 with the inner face of the central portion of the tire, as is clearly shown in Fig. 2. In practice the tire is shrunk into place, and is held firmly without the use of bolts passing through the felly. It will be seen that this special construction of parts holds both the tire and the cushion tire against lateral movement, thereby dispensing with the necessity for bolts, renders it practically impossible for the cushion tire to be compressed outward between the tire and the side pieces, and, furthermore, that the engagement of the projections on the side pieces with the shoulders on the felly insures that all the compressive strain upon the side pieces be taken up by the felly itself, so that there is no strain upon rivets 6, and consequently no tendency to displace the side pieces in use. The fact that bolts through the tire and the felly are entirely dispensed with proves to be a very valuable feature in use and adds greatly to the life of the wheel.

Having thus described my invention, I claim—

1. A vehicle-wheel having a felly provided with shoulders on its outer periphery, side pieces having inward projections, the lower faces of which bear against the shoulders and the inner faces against the felly above the shoulders, the peripheries of said side pieces inclining from their inner faces downward and outward, a cushion tire resting upon the felly between said projections, and a tire resting upon the cushion tire and having on its inner periphery projections thickest at their outer edges, the inner faces of which incline from the outer edges upward and inward, leaving spaces between the peripheries of the side pieces and the projections on the tire on opposite sides of the cushion tire.

2. A vehicle-wheel consisting of a felly having shoulders 3, side pieces having projections resting on said shoulders and inclines on their peripheries, a cushion tire resting on the felly between said projections, and a tire resting on the cushion tire and having a rib engaging said cushion tire, and projections on its inner periphery made thickest at their outer edges, substantially as described.

In testimony whereof I affix my signature in presence of two witnesses.

EGBERT WOOLSON.

Witnesses:
JACOB M. LAYTON,
HENRY W. BODWELL.